United States Patent [19]

Pilatowicz

[11] 3,974,566
[45] Aug. 17, 1976

[54] METHOD AND APPARATUS FOR ARRESTING MOVEMENT OF A CHAIN SAW CUTTER CHAIN

[75] Inventor: Edward J. Pilatowicz, Los Angeles, Calif.

[73] Assignee: McCulloch Corporation, Los Angeles, Calif.

[22] Filed: Sept. 8, 1975

[21] Appl. No.: 611,143

[52] U.S. Cl. .............................. 30/382; 188/170; 192/17 A
[51] Int. Cl.² ........................................ B27B 17/02
[58] Field of Search ............... 188/77 R, 135, 170; 192/17 A; 30/381, 382, 383, 384, 385, 386, 387

[56] References Cited
UNITED STATES PATENTS

| | | | |
|---|---|---|---|
| 3,664,390 | 5/1972 | Mattsson | 30/381 |
| 3,776,331 | 12/1973 | Gustafsson | 30/381 X |
| 3,793,727 | 2/1974 | Moore | 30/383 |
| 3,810,309 | 5/1974 | Wiklund | 30/382 |
| 3,923,126 | 12/1975 | Bidanset | 30/381 X |

*Primary Examiner*—Al Lawrence Smith
*Assistant Examiner*—J. C. Peters

[57] ABSTRACT

Method and apparatus for arresting the movement of a chain saw cutter chain wherein control energy is developed by the chain saw engine, stored, and used to disable a chain saw brake mechanism.

Method and apparatus for arresting the movement of a chain saw cutter chain wherein an inertia device, independent of chain saw operator manipulation, serves to actuate the release of chain saw engine developed and stored energy, with the energy release functioning to actuate a chain saw brake.

Method and apparatus for arresting the movement of a chain saw cutter chain wherein a pressurized body of fluid is generated by chain saw operation and is employed to actuate a chain saw brake.

10 Claims, 6 Drawing Figures

METHOD AND APPARATUS FOR ARRESTING MOVEMENT OF A CHAIN SAW CUTTER CHAIN

GENERAL BACKGROUND AND SUMMARY OF INVENTION

Continuing efforts to improve the safety and efficiency with which chain saws may be operated have produced a variety of chain saw safety mechanisms. Many such mechanisms are designed to avert the movement of a chain saw cutter chain in response to adverse or potentially dangerous operating conditions.

Such conditions may entail abrupt or uncontrolled chain saw movements occur, such as "kick-backs", or operations where an operator's hand slips off of the supporting handle structure of a chain saw.

Many chain saw safety devices intended to avert cutter chain movement depend upon operator manipulation of chain saw safety components such as "dead man" handles or switches, or safety bars or handles in order to effect actuation of cutter chain stopping devices. Representative disclosures of such chain saw operator manipulated safety devices include:

| Country | Patentee | No./Date |
| --- | --- | --- |
| United States | Irgens | 3,361,165/Jan. 2, 1968 |
| United States | Mattson et al | 3,664,390/May 23, 1972 |
| United States | Moore | 3,739,475/June 19, 1973 |
| United States | Gustafsson | 3,776,331/Dec. 4, 1973 |
| United States | Johansson | 3,785,465/Jan. 15, 1974 |
| United States | Johansson | 3,807,538/Apr. 30, 1974 |
| Sweden | Westerlund | 359170/Mar. 18, 1970 |

Chain saw devices, characterized by inertia device actuated safety brakes and which are not dependent upon operator manipulation, are set forth in the following disclosures:

| Country | Patentee | No./Patent Date |
| --- | --- | --- |
| United States | Wilkin | 3,485,326/Dec. 23, 1969 |
| United States | Gudmundsen | 3,485,327/Dec. 23, 1969 |
| United States | Johansson | 3,785,465/Jan. 15, 1974 |

Other chain saw safety mechanisms are featured in other issued patents and pending applications, some of which are assigned to the assignee of the present invention.

The present invention, believed to advance the chain saw safety mechanism art, departs significantly from prior art teachings such as those noted above.

The present invention is multifaceted in nature and is believed to achieve significant improvements with respect to the development of a reliable and rapidly responding chain saw mechanism, making effective use of chain saw-generated energy as the safety device-actuating means.

Moreover, these advantages are achieved without having to significantly or drastically alter conventional chain saw structure and without materially or significantly increasing overall chain saw size.

The advance in the art entailed in the present invention involves three independently viable concepts, usable separately or in combination in chain saw safety devices and chain saw safety techniques.

A first independently significant facet of the invention resides in a method and apparatus characterized by the use of chain saw-developed and stored energy which is employed to de-activate or disable a continuously operable safety mechanism while normal cutting operations take place. This technique insures continuous availability of the operating effect of the chain saw safety device, and insures that the chain saw will be operable for normal cutting operations only when the safety mechanism-actuating energy source has in fact been developed and stored.

The second independently significant facet of the invention involves a method and apparatus wherein an inertia mechanism, independent of operator manipulation, is operable in response to adverse conditions such as a chain saw kick-back, to trigger the release of chain saw-generated and stored energy for the purpose of actuating a safety mechanism.

A third independently significant facet of the invention entails the use of a chain saw engine to develop a body of pressurized fluid, with this pressurized fluid body being stored and utilized to actuate a safety mechanism.

These independently significant facets of the invention are practiced in a common method and apparatus context wherein a movement-arresting means is provided which is operable to arrest the movement of cutter chain of a chain saw. A chain saw engine-actuated, energy-developing and storing means is also provided, which is operable to:

develop cutter chain movement-controlling energy during, and in response to, operation of the engine of the chain saw and store this developed energy for subsequent use in actuating the movement-arresting means.

This basic or common context of the invention further entails the provision of movement-control means operable to release the stored, chain saw engine-developed energy. In response to this energy release, the movement-control means is operable to cause motion-arresting force to be imparted to the movement-arresting means.

In this common context of the independently significant aspects of the invention, there is also provided chain saw condition-responsive means. This latter means is operable, in response to a condition of the chain saw adverse to the safety of the operator, to actuate the movement-control means and cause the movement-control means to release the developed energy and cause the motion-arresting force to be imparted to the motion-arresting means.

In the first independently significant facet of the invention, above noted, the chain saw engine-actuated, energy-developing and storing means is operable to apply the stored, chain saw engine-developed energy to the movement-arresting means to prevent its actuation. This disabling actuation, in this aspect of the invention, continues until operation of the movement-control means, in response to actuation by the chain saw condition responsive means, is operable to release the engine-developed energy.

Thus, this aspect of the invention, i.e., the first independently significant facet, deals with a safety mechanism where a cutter chain movement arresting device is disabled only when control energy has been developed and stored by the chain saw and applied to the movement-arresting means of the safety mechanism. When the energy has either been not developed or has been released, the movement-arresting means is automatically operated.

In the secondly independently significant aspect of the invention, the chain saw condition-responsive means constitutes inertia-responsive means independent of chain saw operator manipulation. Such inertia-responsive means is operable in response to a kickback of the chain saw to actuate the movement-control means so as to release the developed and stored energy and cause the motion-arresting force to be imparted to the motion-arresting means.

Thus, this second independently significant facet of the invention is directed to the use of an inertia mechanism — independent of chain saw operator manipulation — which serves to trigger the release of chain saw engine-developed and stored energy for the purpose of actuating a chain saw cutter chain movement-arresting device.

The third independently significant facet of the invention, which like the other two facets, is incorporated in the common contextual setting above discussed, involves the development and storing of cutter chain movement-controlling energy in the form of pressurized fluid.

Thus, this third aspect of the invention entails a unique and specific energy-development and storage technique where the development, storing and release of pressurized fluid governs the operation of a safety mechanism.

Advantageously, the three independently significant facets of the invention may be combined in a composite, fourth concept so as to entail and employ the advantages of each of the three individual invention facets above noted.

A fifth aspect of the invention entails a preferred embodiment arising out of the fourth composite invention concept above noted.

This fifth aspect of the invention is characterized by a rotary inertia mechanism which serves to control the operation of a valve mechanism effecting the containing of the above-noted pressurized fluid. When the rotary inertia mechanism effects opening of the valve, and thereby release of the pressurized fluid, the energy of the heretofore stored pressurized fluid is dissipated so as to remove a brake-disabling, pressure influence acting on a brake-controlling diaphragm means.

In a sixth aspect of the invention, until the pressurized fluid attains a pressure in excess of that which can be developed by the engine operating at idle speed or below, the diaphragm means is unable to disable the braking mechanism, and the cutter chain remains substantially immobile.

In describing the invention by way of example, but not by way of limitation, reference will be made to a preferred embodiment illustrated in drawings appended to this specification.

DRAWINGS

In practicing the invention, the various independently significant facets of the invention above noted may be collectively utilized in a presently preferred embodiment, illustrated in the appended drawings.

In these drawings.

DETAILED DESCRIPTION OF PREFERRED EMBODIMENT AND OVERALL INVENTION

In describing the present invention, a preferred embodiment of a method and apparatus, which implements the previously described, separately significant facets of the invention, will be employed as an appropriate example.

Prior to considering specific details of this preferred embodiment, representative aspects of a chain saw embodiment of the invention will be set forth.

Following the discussion of detailed aspects of the preferred embodiment, consideration will be given to conceptual parameters involving the basic contextual setting of the invention.

REPRESENTATIVE CHAIN SAW STRUCTURE

Figure 1:
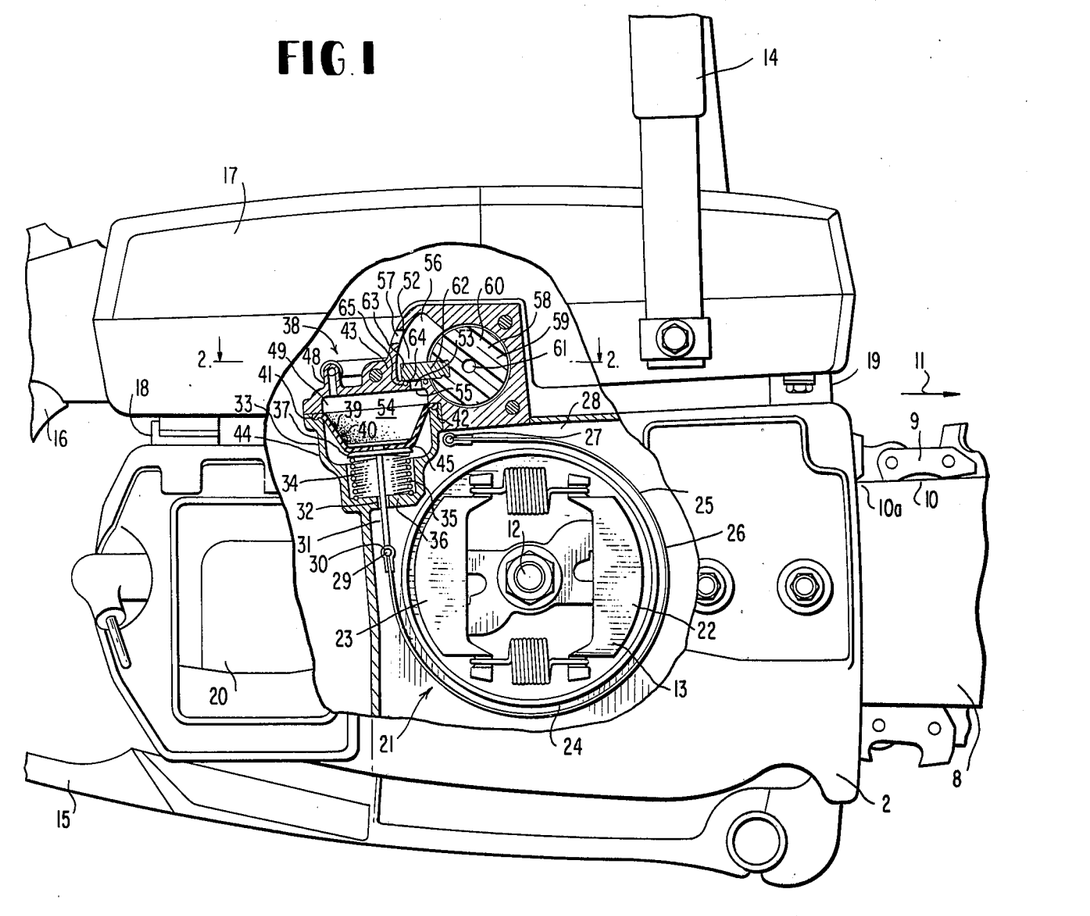
FIG. 1 provides an elevational, fragmentary, partially sectioned view of a side of a chain saw engine housing depicting in a somewhat schematic format the components of the safety mechanism of the present invention.
Figure 2:
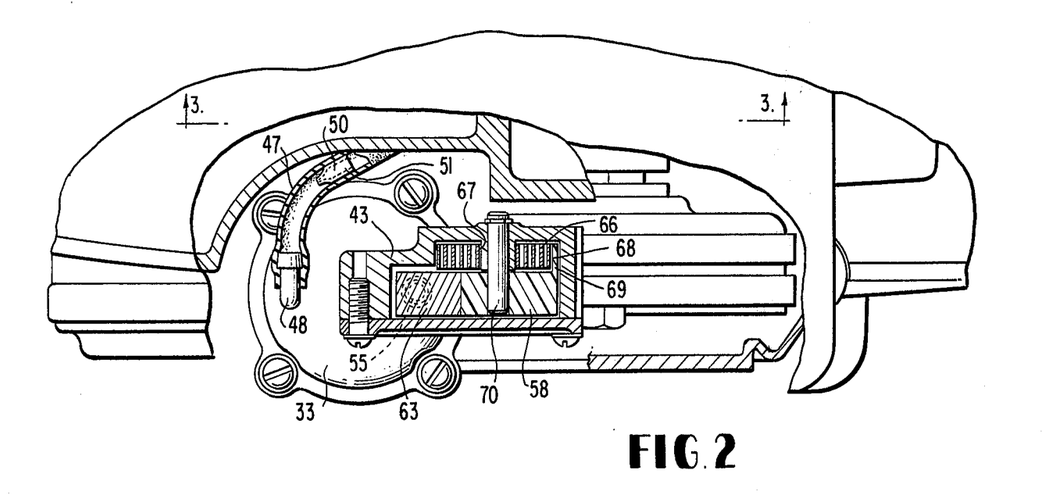
FIG. 2 provides an enlarged, transverse or plan sectional view of a portion of the safety mechanism depicted in FIG. 1, as viewed along section line 2—2 of FIG. 1.
Figures 3, 4B:
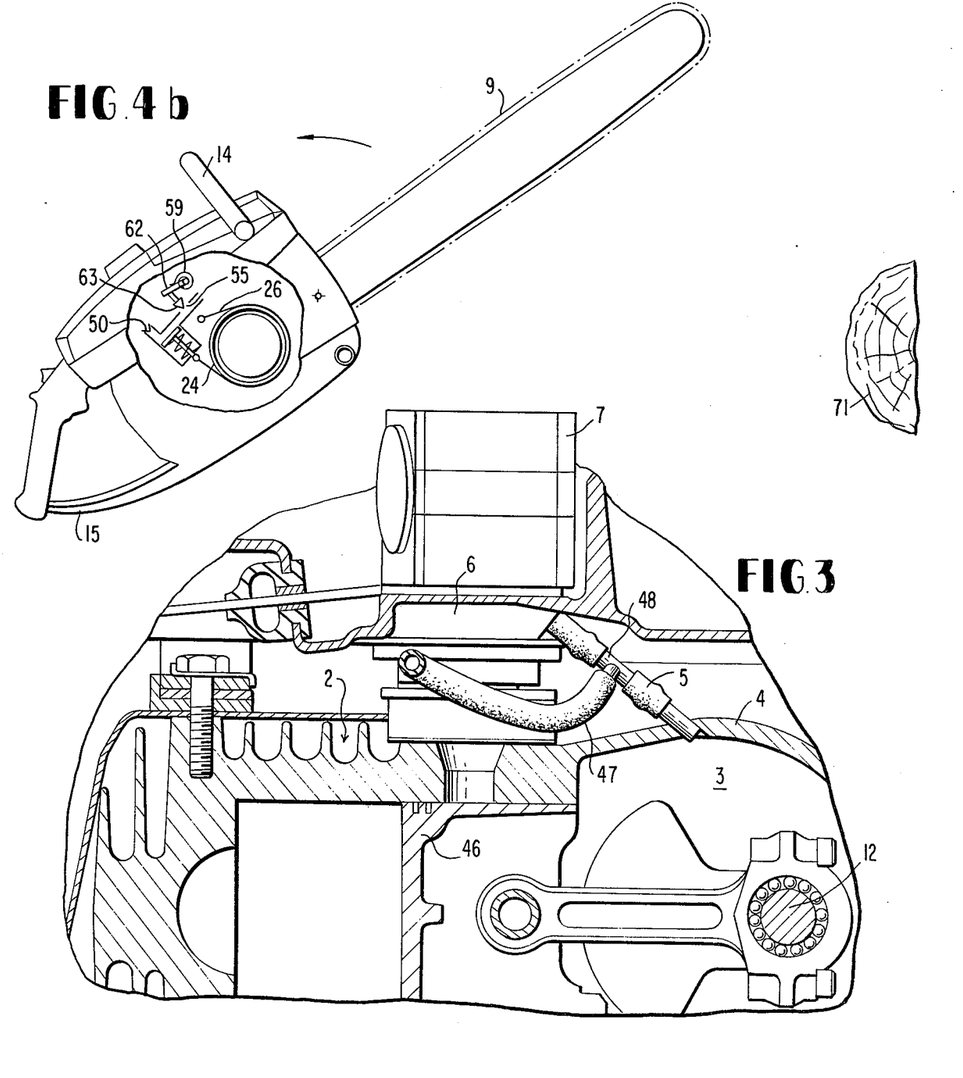
FIG. 3 provides an enlarged, sectional view of the FIG. 1 safety mechanism as viewed along section line 3—3 of FIG. 2, illustrating conduit connections between a chain saw engine crank case and a pressurized fluid-storing chamber of the FIG. 1 safety mechanism.
FIG. 4b depicts, in a schematic and fragmentary format, the FIG. 4a chain saw during a chain saw kickback where the safety mechanism has been actuated and has arrested movement of the chain saw cutter chain.

FIGS. 1–3 depict representative structural details of a chain saw in which the present safety mechanism may be advantageously incorporated.

As shown in FIG. 1, a chain saw 1 is provided which includes a chain saw engine 2. This engine 2 may be of the conventional two-cycle type wherein pressure pulses are developed within the interior 3 of the engine crank case 4. Conventionally, these pressure pulses are transmitted through connecting conduit means 5 to a fuel pump 6 associated with an engine carburetor 7.

In a manner now understood in the art, the pressure pulses transmitted from crank case interior 3 through conduit 5 to fuel pump 6 serve to provide pressurized fuel to fuel feeding orifices of the induction passage of the carburetor 7.

Representative disclosures of crank case pressure pulse-actuated fuel pumps are provided by Barr U.S. Pat. No. 3,104,617 (Sept. 24, 1963); Hazzard U.S. Pat. No. 3,367,637 (Feb. 6, 1968) and Barr et al. U.S. Pat. No. 3,441,010 (Apr. 29, 1969). To the extent applicable to the present invention, these disclosures are herein incorporated by reference.

Chain saw 1 further includes a cutter chain supporting guide bar 8. A cutter chain 9 is slidably supported on the grooved periphery 10 of the guide bar 8 for continuous movement about the cutting path defining periphery of the guide bar 8.

As shown in FIG. 1, cutter chain 9, on the upper edge 10a of the guide bar 8 will generally move in a direction 11 outward of the engine 2 (i.e., to the right as shown in FIG. 1).

Crank shaft 12 of engine 2, generally depicted in FIGS. 1 and 3, may support a centrifugal clutch mechanism 13. Clutch 13 provides a centrifugally responsive drive connection between the chain saw engine 2 and the cutter chain 9 by way of an appropriate drive sprocket (not shown).

The centrifugal clutch 13 depicted in a partially broken away format in FIG. 1 may comprise a centrifugal clutch as featured in Collins U.S. Pat. No. 3,385,411 (May 28, 1968), the disclosure of which is herein incorporated by reference.

The driven or output member of centrifugal clutches such as those featured in the aforesaid Collins U.S. Pat. No. 3,385,411, are usually provided with sprocket mechanisms for imparting rotary driving energy to the cutter chain. Representative sprocket-driving arrangements of this nature are featured for example in Gudmundsen U.S. Pat. No. 3,279,272, (Oct. 18, 1966); Ehlen U.S. Pat. No. 3,358,523 (Dec. 19, 1967); and Gasner U.S. Pat. No. 3,683,980 (Aug. 15, 1972).

To the extent applicable to the present invention, the disclosures of the aforementioned patents, dealing with exemplary centrifugal clutch and sprocket drive mechanisms are herein incorporated by reference.

Chain saw 1 further includes handle mechanisms to facilitate an operator's manipulation of the chain saw during cutter operation.

Thus, chain saw 1 may be provided with an upper, transversely extending handle 14 and a longitudinally extending handle 15. Conventionally, an engine-actuating throttle trigger 16 would be incorporated in the handle means 15.

Chain saw 1 may additionally include a fuel tank assembly 17 comprising a continuation of the upper portion of handle 15. Vibration-isolating units (not shown) may be provided at locations 18 and 19 as shown in FIG. 1 so as to afford a vibration-isolating connection between the lower portion of the fuel tank assembly 17 and the upper portion of the engine housing 2. Similarly, another vibration-isolating connection, not shown, may be incorporated between the lower leg of the handle 15 and the underside of the engine 2.

Chain saw vibration-isolation systems of the type above noted are featured, for example, in Frederickson et al. U.S. Pat. No. 3,542,095 (Nov. 24, 1970); Frederickson et al. U.S. Pat. No. 3,698,455 (Oct. 17, 1972) Frederickson et al. U.S. Pat. No. 3,652,074 (Mar. 28, 1972), and Frederickson et al. U.S. Pat. No. 3,813,776 (June 4, 1974), as well as in other patents and applications dealing with chain saw vibration-isolation systems issued to the assignee of the present application. To the extent applicable to the present invention, the disclosure of the foregoing Frederickson et al. patents are herein incorporated by reference.

Chain saw 1 may be further provided with a noise-attenuating muffler mechanism 20. Representative disclosures of advantageous muffler mechanism which may be used with particular efficiency in a chain saw setting are provided by Bailey U.S. Pat. No. 3,318,412 (May 9, 1967) and Bailey U.S. Pat. No. 3,643,759 (Feb. 22, 1972). To the extent applicable to the present invention, the disclosures of the foregoing Bailey patents are herein incorporated by reference.

Having described representative and exemplary aspects of the chain saw setting of the invention, it is now appropriate to give consideration to detailed structural and operational aspects of the cutter chain arresting safety mechanism which characterizes the present invention, and admirably complements the other, vibration-isolating and noise attenuating safety features noted above.

This discussion will be initiated with a description of a presently preferred embodiment of the invention.

DETAILS OF PRESENTLY PREFERRED EMBODIMENT OF CUTTER CHAIN MOTION-ARRESTING MECHANISM

The concept for arresting the movement of a cutter chain of a chain saw, as presented through this invention, entails the utilization of movement-arresting means 21. Movement-arresting means 21 is operable to arrest the cutting movement of cutter chain 9 of chain saw 1 in a manner to be subsequently described.

Movement-arresting means 21 may include the centrifugal clutch 13 which provides a centrifugally responsive drive connection between the engine 2 of chain saw 1 and the cutter chain 9.

This centrifugal connection as is described in the aforementioned Collins patent, includes centrifugally responsive clutch shoes 22 and 23. These clutch shoes are rotatably carried by the crank shaft 12 and are operable to clutchingly engage a clutch drum 24 which is freely journaled on the crank shaft 12. As has been earlier noted, clutch drum 24 supports the drive sprocket (not shown) which engages the cutter chain 9 and thus serves to transfer driving energy from the engine 2 to the cutter chain 9 when the drum 24 is centrifugally engaged by the clutch shoes 22 and 23.

Movement-arresting means 21 further includes brake means 25. This brake means is operable to brakingly engage the outer periphery of the clutch drum 24 and thereby arrest the transmission of driving energy from the engine 2 to the cutter chain 9.

Brake means 25 may comprise a flexible, metallic band 26 which is connected at one end by a mounting pin 27 to the engine housing 28. Another end 29 of the brake band 26 may be connected by a pin connection 30 to a brake-actuating shaft or rod 31.

Rod 31 projects slidably through an aperture 32 in a housing 33 which serves to contain a body of engine operation-developed pressurized fluid in a manner to be subsequently discussed.

Movement-arresting means 21 further includes a spring means 34 which is continuously biased or stressed in a brake applying mode and which is operable when released, to impart braking force to the brake band 26. When this braking force is applied and causes the rod 31 to move outwardly as shown in FIG. 1, the brake band 26 is contracted about the periphery of the drum 24 so as to apply braking force to the brake means 25. This application of braking force is operable to interrupt or arrest movement of the chain-driving clutch drum 24 and thereby arrest movement of the cutter chain 9 itself.

Spring means 34, as depicted in FIG. 1 may comprise a compressed coil spring 35 mounted between the lower end 36 of the housing 33 and a plate 37 affixed to the outer extremity of the rod 31.

Spring 35 is depicted in FIG. 1 in a longitudinally compressed condition which enables the band 26 to be maintained in an expanded or non-braking condition. When the coil spring 35 is allowed to extend (i.e., move toward its relaxed condition) the rod 31 will be moved upwardly as shown in FIG. 1 so as to induce contracting or braking actuation of the band 26 i.e., so as to constrict the band 26 into braking cooperation with the cylindrical outer periphery of the drum 24.

The movement-arresting concept of the invention further involves the provision of a chain saw engine actuated, energy-developing and storing means 38.

The chain saw engine - actuated, energy-developing and storing means 38 is operable to develop cutter chain movement-controlling energy, in the form of a body of pressurized fluid, during and in response to operation of the engine 2 of the chain saw 1, and store the pressurized fluid for subsequent use in actuating the movement-arresting means 21, and apply this stored chain saw engine-developed pressurized fluid to the movement arresting means 21 so as to prevent actuation thereof.

The functional aspects of the chain saw engine-actuated, energy-developing and storing means 38 are accomplished by a combination of features including a diaphragm means 39 generally depicted in FIG. 1 in cross-section.

Diaphragm means 39 may advantageously comprise a cup-shaped, elastomeric rolling diaphragm 40 having its outer lip portion 41 secured in a groove 42 between abutting edges of separable housing halves 43 and 44. Such a diaphragm may be obtained from Vernay Laboratories, Inc., Yellow Springs, Ohio.

As is shown in FIG. 1, the lower portion 45 of diaphragm 40 is connected with the rod-mounting plate 37 so as to be operable to control brake-setting and releasing movement of the spring 35 and thereby control transmission of force from the spring 35 to the brake band 26.

The energy-developing and storing means 38 may be considered as additionally including the crank case 34 which provides the crank case interior 3 within which pressure pulses are developed in response to reciprocating movement of the engine piston 46.

Crank case interior 3 is operable to supply pressurized gas to the energy-developing and storing means 38 by way of branch conduit means 47. Branch conduit means 47 is joined to the aforenoted conduit means 5 by a "T" connection 48 and extends to a conduit-receiving or mating fitting 48 depicted generally in FIGS. 1 and 2.

Fitting 48 communicates with the interior of a pressure chamber 49 contained in an upper portion of housing 33 as depicted in FIG. 1, generally above the diaphragm 40.

Pressure chamber 49 is operable to effect the storing of a body 54 of pressurized gas transmitted via conduit means 5 and 47 from crank case interior 3 to the pressure chamber 49.

The diaphragm 40, which is exposed to the pressurized gas within the pressure chamber 45, serves to transmit the pressure of pressurized gas stored within the chamber 49 to the diaphragm 40. When pressurized fluid is thus applied to the upper side of diaphragm 40, a brake-disabling force is created which serves to counteract the brake-applying force of the spring 35.

Thus, while pressurized fluid is stored or trapped within the chamber 49, it serves to generate a brake-disabling force which is transmitted to the brake band 26 so as to tend to maintain the brake band 26 in the expanded or non-braking condition as depicted in FIG. 1.

The trapping of pressurized gas within the chamber 49 is effected by a check valve 50, which may comprise a rubber of neoprene "duck bill" check valve 51 incorporated in conduit means 47 as depicted in FIG. 2. A check valve of this type is available from Vernay Laboratories, Inc., Yellow Springs, Ohio and is operable to permit a one-way flow of pressurized fluid from the crank case interior 3 to the pressure chamber 49. However, this check valve will block or substantially prevent flow of pressurized gas from the pressure chamber 49 to the crank case interior 3.

An additional component of the cutter chain-arresting mechanism of the present invention comprises a movement-control means 52. Movement-control means 52 is operable to release the stored pressurized fluid within cavity 49. In response to this release of pressurized fluid from cavity 49, the pressure acting on the diaphragm 40 is relieved so as to cause motion-arresting force to be imparted by the spring 35 to the cutter chain movement arresting brake band 26 of the movement-arresting means 21.

Movement-control means 52 includes vent means 53 which is located in an upper portion of chamber 49. As illustrated in FIG. 1, vent means 53 may be located in housing section 43.

Vent means 53, when opened, in response to the operation of an inertia-responsive means, to be subsequently described, is operable to vent pressure from the chamber 49 and effect release of the pressurized fluid body 54 which is stored within the chamber 49 in response to operation of the engine.

The vent means 53 includes a vent opening 55 formed in the upper wall of the chamber 49 as provided by housing section 43, a cavity 56 communicating with the upper side of vent 55 and located within housing component 43 as shown in FIG. 1, and another vent 57 which provides communication between cavity 56 and the atmosphere.

As will be apparent from the foregoing discussion, when the vent means 53 is in a closed condition the pressurized fluid body 54, housed within chamber 49, is operable to impart fluid pressure to the diaphragm 40. This imparting of fluid pressure to the diaphragm 40 causes the diaphragm 40 to maintain the brake-actuating spring 35 in a contracted condition, such that the spring 35 is not operable to impart braking force to the brake band 26.

Thus, until the engine operates and develops sufficient pressure in crank case 3 and transmits sufficient pressure to the chamber 49 to counteract, and overcome through the diaphragm 40, the biasing influence of spring 35, the cutter chain 9 will be disposed in a braked or arrested condition because the brake band 26 will be disposed in contracted, braking engagement with the clutch drum 24.

Similarly, when the vent means 53 is open to the atmosphere so as to dissipate pressure within the fluid body 54 housed within chamber or cavity 49, the diaphragm 40 will not provide a significant counteracting force with respect to the crank spring 35, and again, the brake band 26 will be disposed in a contracted, braking cooperation with the clutch drum 24 so as to arrest movement of the cutter chain 9.

The safety mechanism of the invention further includes a chain saw condition responsive means 58 which may comprise an inertia-responsive mechanism 59, as shown in FIG. 1.

Chain saw condition responsive means 58 is operable, in response to a condition of the chain saw adverse to the safety of an operator hereof, to actuate the movement-control means 21 and cause this movement-control means to release the pressurized fluid 54 from cavity 49, and cause motion-arresting force to be imparted (in the preferred embodiment by way of spring 35) to the motion-arresting means 21 (i.e., in the preferred embodiment, the brake band 26).

In the preferred embodiment, the chain saw condition-responsive means constitutes an inertia-responsive means 59 which is independent of chain saw operator manipulation.

The inertia-responsive means 59, as generally depicted in FIGS. 1 and 2, includes a rotor means 60 which is journaled in portion 43 of the housing 33 for rotation about an axis 61 extending generally transversely, and preferably perpendicularly of, the longitudinal median plane of the guide bar 48.

Inertia-responsive means 59 further includes an eccentric weight means 62 which is carried by the rotor 58 on one side thereof, i.e., the rearward or left side of the rotor 58, viewing the apparatus as shown in FIG. 1.

The eccentric weight 62 is operable to cause the rotor 48 to undergo rotary movement relative to the vent 55 of the pressure chamber 49 in response to a kick-back of the chain saw, i.e., an abrupt counter clockwise rotational movement of the chain saw, when the chain saw is viewed as shown in FIG. 1.

Such rotational movement results from the inertia of the rotor 58, including the eccentric weight 62, coupled with the counterclockwise movement of the chain saw body. Thus, when a chain saw kick-back occurs, the rotor 58 will momentarily tend to remain more or less in the orientation depicted in FIG. 1, while the vent 55 will rotate counterclockwise away from the underside of the eccentric weight 62. As shown in FIG. 1, blade-like weight 62 projects transversely across the upper side of the vent 55.

Thus, as will now be appreciated, the eccentric 62, on its lower surface, in essence provides a vent controlling valve means 63. This valve means 63 is carried by the rotor 58 and is operable to open the vent means 53 (by uncovering the vent 55) in response to the previously noted rotary movement of the rotor 58.

If desired, the vent means 53 may include an "O" ring or other flexible valve sent engaging the underside 64 of the valve means 63 to provide an effective valve seat cooperating with the valve means 63. Such a flexible seat may comprise an O-ring 65 mounted around the upper rim of the vent 55 in the general manner depicted in FIG. 1.

As will be appreciated at this juncture, the vent cavity 56 provides a travel path facilitating the relative rotational movement between the rotor 58 and the pressure cavity 49, such that the eccentric weight 62 - valve 63 may translate between the chamber - closing position depicted in FIG. 1 and a valve-opening position where the valve 63 eccentric 62 would be positioned upwardly within the cavity 56 so as to open the vent system 53.

The inertia-responsive means 59 may additionally include a torsional or spiral biasing spring 66, as generally depicted in FIG. 2.

Spring 66 is operable to exert a counter clockwise rotary biasing force on the rotor 58, when the apparatus is viewed as shown in FIG. 1. Spring 66 will bias the rotor to the FIG. 1 position where the valve means 63 is operable to close the vent means 53 by engaging the valve seat 65 associated with the vent 55.

Torsional spring 66 may thus comprise a torsionally biased spring having one end 67 connected with housing 43 and another end 68 connected with a flange portion 69 of the rotor 58. With the rotor 58 being freely journaled on a mounting shaft 70, carried by housing section 33, as depicted in FIG. 2, and with the spring 66 being prestressed or biased in a counter clockwise torsional direction as depicted in FIG. 1, the valve 63 will be normally biased to the vent-closing position depicted in FIG. 1.

As will here be appreciated, when the vent means 53 is operated in response to kick-back induced operation of the inertia-responsive means 59, the vent means 53 is operable to vent fluid pressure from pressure chamber means 49, and permit the spring 35 to apply braking force to the brake band 26 so as to arrest the transmission of energy from the engine 2 to the cutter chain 9.

From the foregoing discussion, it will be appreciated that the spring 35 is operable to impart braking force to the brake band 26 until, with the vent means 53 closed via the valve means 63, the chain saw engine 2 achieves an operating speed in excess of a normal idle speed and thus develops a sufficient pressure in the crank case interior 3. This pressure must be such as to transmit pressurized fluid to the pressure chamber 49 having a pressure sufficient to act on the diaphragm 40 and cause the diaphragm 40 to overcome the brake-setting force of the spring 35 which would be required to impart an effective braking force to the brake band 26. Thus, the strength of spring 35 will determine the threshold engine speed where movement of cutter chain 9 will commence.

Figure 4A:
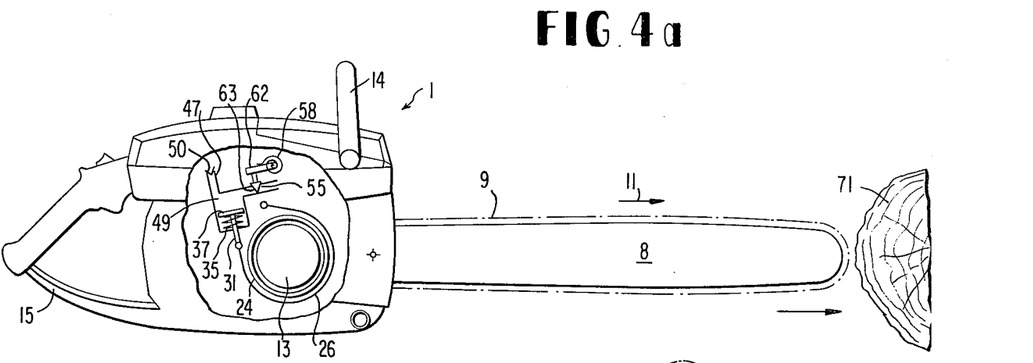
FIG. 4a provides a schematic, fragmentary, side elevational view of a chain saw as depicted in FIG. 1 with the safety mechanism permitting normal cutter chain movement.

In summarizing the mode of operation of the chain saw movement-controlling safety device of the present invention, it may be convenient to refer to the schematic illustrations of FIGS. 4a and 4b.

FIG. 4a depicts the chain saw 1 in an operating condition where the crank case 3 has transmitted sufficient pressure to chamber 49 through check valve 50, with the valve 63 closing the vent 55, so as to maintain the brake band 26 in its expanded condition. This results of course from the pressure in chamber 49 acting through diaphragm 40 (not shown) on the mounting plate 37 at the upper end of the spring-connected rod 31 so as to maintain the brake-setting spring 35 in the contracted position.

When the chain saw is operated so as to engage a log or piece of timer 71, and kick-back occurs, as depicted in FIG. 4b, the safety mechanism of the present invention automatically induces motion-arresting movement of the cutter chain 9. This motion-arresting movement occurs because of the inertia of the rotor 58-eccentric weight 62 which in essence causes the vent 55 to rotate counterclockwise away from the rotor-carried valve 63 so as to momentarily open the vent 55 and permit the venting of pressurized fluid from the chamber 49. When this venting occurs, the spring 35 becomes operable to move the rod 31 generally upwardly as shown in FIG. 4b so as to contract the band 26 about the clutch drum 24 and thereby arrest the driving connection between the engine 2 and the cutter chain and consequently arrest cutter chain movement. Since the valve 63 will automatically reclose under the influence of spring 66, cutting may be resumed after the kick-back, and after normal, cutting engine speed has resumed, without requiring any manual resetting of the safety device.

With structural and operational characteristics of the presently preferred embodiment of the invention having been described in detail, it is now appropriate to consider, in a conceptual format, various functions which are performed in the practice of the invention.

FUNCTIONAL SEQUENCE

Figure 5:
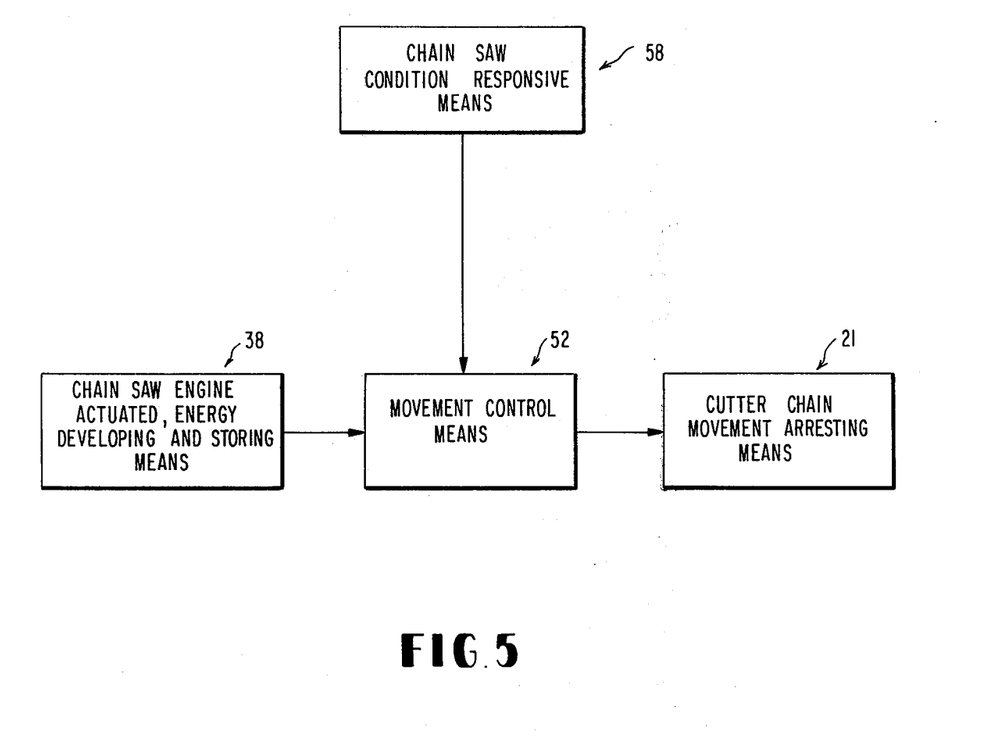
FIG. 5 provides a block diagram depiction or representation of inter-relationships of certain contextual components common to all aspects of the invention heretofore described.

FIG. 5, schematically illustrates the sequence in which certain functional steps supportive of characterizing features of this invention are performed.

As depicted in FIG. 5, the operation of the chain saw engine 2 enables the chain saw engine-actuated, energy-developing and storing means 38 to develop and store energy. The transmission of this energy to the movement-arresting means 21 is controlled by the movement-control means 52. Actuation of the movement-control means 52, in order to effect the transmission of energy-developed and stored energy to the movement-arresting means 21, is in turn controlled by the chain saw condition-responsive means 58.

Those skilled in the chain saw safety art and familiar with this disclosure will recognize, within the general skill of the art, the various approaches which may be taken in connection with these functions, all within the context of the individually significant facets of the invention as heretofore set forth.

For example, the energy-developing and storing means 38 may serve to develop a body of pressurized fluid which may comprise a gas or liquid. Alternatively, the energy-developing and storing means may develop and store electrical energy or may develop and store mechanical energy through for example a spring mechanism.

The movement-control means 52 may comprise a vent for fluid, when pressurized fluid constitutes the stored energy source, or may constitute a circuit for permitting a flow of electrical energy, when electrical energy is being stored. When a mechanical energy storing system is involved, the movement-control means 52 may comprise a mechanical release mechanism.

The movement-arresting means 21 may comprise a band or disc brake or other type of braking mechanism, associated with mechanical fluid or electrical brake-biasing systems. Alternatively, the movement-arresting means may comprise a mechanism for interrupting or disabling the drive connection between the chain saw engine and the cutter chain or a combination of such an interrupting and disabling mechanism with a braking device. Moreover, the movement-arresting means 21 may be actuated by using the stored energy to trigger a collateral brake setting energy device such as spring 35 or may be actuated by using the stored energy to directly actuate the movement-arresting means.

the condition-responsive means 58 may comprise an inertia device independent of operator manipulation and may take the form of a mechanical, inertia-responsive means such as a rotary or linearly movable inertia weight or may comprise an electrical type of inertia switch or mechanism or a fluid type of inertia switch or mechanism. Further, a condition-responsive means, in certain instances, and in relation to the above noted, first and third independently significant aspects of the invention, may comprise safety handles or dead man throttle mechanisms, etc.

SUMMARY OF MAJOR ADVANTAGES AND OVERALL SCOPE OF INVENTION

Through the maintenance of a continuously effective biasing acting on the brake system, and through the utilization of engine-developed and stored or accumulated energy, a safety mechanism is provided which affords ample energy for emergency stopping of the chain saw, with the operability of the safety system being continuous in nature and not dependent upon the safety system being rendered operable in response to manual manipulations, etc. Thus, the braking system will normally be operable until the chain saw itself has become operational and developed and stored sufficient energy to disable the braking system and permit chain saw cutting operations. The engine-developed and stored energy then assures the availability of an adequate braking force to effect prompt termination of chain saw cutter chain movement.

The aspect of the invention dealing with an operator-independent, inertia-triggering mechanism, to effect the release of engine-developed and stored energy, provides a safety mechanism which is operational without requiring operator intervention and which insures the availability of sufficient energy for reliable and rapid termination of cutter chain movement.

The aspects of the invention dealing with the utilization of crank case pressure to develop a body of energy in the form of pressurized fluid effectively utilizes existing chain saw structures to develop a sufficiently large body of energy without requiring the utilization of separate energy-developing means which would enlarge the bulk or size of the chain saw. Moreover, this concept enables energy to be developed and stored without diverting engine energy from normal cutting operations.

The rotor and vented chamber and diaphragm concepts are believed to contribute a particularly facile, economical, and reliable safety mechanism capable of being incorporated in small space and capable of being installed on conventional chain saws without requiring any significant modification or alteration of existing chain saw structure.

Those skilled in the chain saw safety art and familiar with the disclosure of this invention may well recognize additions, deletions, substitutions, and modifications in addition to those described which would fall within the purview of the invention as set forth in the appended claims.

What is claimed is:

1. A method for arresting the movement of the cutter chain of a chain saw, said method comprising:
    providing movement-arresting means operable to arrest the movement of a cutter chain of a chain saw;
    providing chain saw engine-actuated, energy-developing and storing means operable to
        develop cutter chain movement controlling energy during, and in response to, operation of the engine of said chain saw,
        store said developed energy for subsequent use in actuating said movement-arresting means,
        apply said stored, chain saw engine-developed energy to said movement-arresting means to prevent actuation thereof;
    providing movement-control means operable to
        release said stored, chain saw engine-developed energy and, in response to said energy release, cause motion-arresting force to be imparted to said movement-arresting means; and providing chain saw condition-responsive means operable, in response to a condition of said chain saw adverse to the safety of the operator thereof, to actuate said movement-control means and cause said movement-control means to release said developed energy, and cause said motion-arresting force to be imparted to said motion-arresting means.

2. A method for arresting the movement of the cutter chain of a chain saw, said method comprising:

providing movement-arresting means operable to arrest the movement of a cutter chain of a chain saw;

providing chain saw engine-actuated, energy-developing and storing means operable to develop cutter chain movement-controlling energy during, and in response to, operation of the engine of said chain saw;

store said developed energy for subsequent use in actuating said movement-arresting means, providing movement-control means operable to release said stored, chain saw engine-developed energy and, in response to said energy release, cause motion-arresting force to be imparted to said movement-arresting means; and providing inertia-responsive means, independent of chain saw operator manipulation, operable, in response to a kick-back of said chain saw, to actuate said movement-control means to release said developed energy, and cause said motion-arresting force to be imparted to said motion-arresting means.

3. A method for arresting the movement of the cutter chain of a chain saw, said method comprising:

providing movement-arresting means operable to arrest the movement of a cutter chain of a chain saw;

providing saw engine-actuated, energy-developing and storing means operable to develop cutter chain movement controlling, pressurized fluid means during, and in response to, operation of the engine of said chain saw;

store said pressurized fluid means for subsequent use in actuating said movement-arresting means, providing movement-control means operable to release said stored, pressurized fluid means, in response to said pressurized fluid release, cause motion-arresting force to be imparted to said movement-arresting means; and providing chain saw condition-responsive means operable, in response to a condition of said chain saw adverse to the safety of the operator thereof, to actuate said movement-control means and cause said movement-control means to release said pressurized fluid means, and cause said motion-arresting force to be imparted to said motion-arresting means.

4. A method for arresting the movement of the cutter chain of a chain saw, said method comprising:

providing movement-arresting means operable to arrest the movement of a cutter chain of a chain saw;

providing chain saw engine-actuated, energy-developing and storing means operable to develop cutter chain movement controlling pressurized fluid means during, and in response to, operation of the engine of said chain saw, store said pressurized fluid means for subsequent use in actuating said movement-arresting means, apply said stored, chain saw engine-developed pressurized fluid means to said movement-arresting means to prevent actuation thereof;

providing movement-control means operable to release said stored, pressurized fluid means and, in response to said pressurized fluid release, cause motion-arresting force to be imparted to said movement-arresting means; and providing inertia-responsive means independent of chain saw operator manipulation, operable, in response to a kick-back of said chain saw, to actuate said movement-control means and cause said movement-contol means to release said pressurized fluid means, and cause said motion-arresting force to be imparted to said motion-arresting means.

5. An apparatus for arresting the movement of the cutter chain of a chain saw, said apparatus comprising:

movement-arresting means operable to arrest the movement of a cutter chain of a chain saw;

chain saw engine-actuated, energy-developing and storing means operable to develop cutter chain movement controlling energy during, and in response to, operation of the engine of said chain saw, store said developed energy for subsequent use in actuating said movement-arresting means, apply said stored, chain saw engine-developed energy to said movement-arresting means to prevent actuation thereof;

movement-control means operable to release said stored, chain saw engine-developed energy and, in response to said energy release, cause motion-arresting force to be imparted to said movement-arresting means; and chain saw condition-responsive means operable, in response to a conditon of said chain saw adverse to the safety of the operator thereof, to actuate said movement-control means and cause said movement-control means to release said developed energy, and cause said motion-arresting force to be imparted to said motion-arresting means.

6. An apparatus for arresting the movement of the cutter chain of a chain saw, said apparatus comprising:

movement-arresting means operable to arrest the movement of a cutter chain of a chain saw;

chain saw engine-actuated, energy-developing and storing means operable to develop cutter chain movement-controlling energy during, and in response to, operation of the engine of said chain saw;

store said developed energy for subsequent use in actuating said movement-arresting means, movement-control means operable to release said stored, chain saw engine-developed energy and, in response to said energy release, cause motion-arresting force to be imparted to said movement-arresting means; and inertia-responsive means, independent of chain saw operator manipulation, operable, in response to a kick-back of said chain saw, to actuate said movement-control means to release said developed energy, and
cause said motion-arresting force to be imparted to said motion-arresting means.

7. An apparatus for arresting the movement of the cutter chain of a chain saw, said apparatus comprising:
movement-arresting means operable to arrest the movement of a cutter chain of a chain saw;
chain saw engine-actuated, energy-developing and storing means operable to
develop cutter chain movement controlling, pressurized fluid means during, and in response to, operation of the engine of said chain saw;
store said pressurized fluid means for subsequent use in actuating said movement-arresting means,
movement-control means operable to
release said stored, pressurized fluid means, in response to said pressurized fluid release, cause motion-arresting force to be imparted to said movement-arresting means; and
chain saw condition-responsive means operable, in response to a condition of said chain saw adverse to the safety of the operator thereof, to actuate said movement-control means and cause said movement-control means to
release said pressurized fluid means, and
cause said motion-arresting force to be imparted to said motion-arresting means.

8. An apparatus for arresting the movement of the cutter chain of a chain saw, said apparatus comprising:
movement-arresting means operable to arrest the movement of a cutter chain of a chain saw;
chain saw engine-actuated, energy-developing and storing means operable to
develop cutter chain movement controlling pressurized fluid means during, and in response to, operation of the engine of said chain saw,
store said pressurized fluid means for subsequent use in actuating said movement-arresting means,
apply said stored, chain saw engine-developed pressurized fluid means to said movement-arresting means to prevent actuation thereof;
movement-control means operable to
release said stored, pressurized fluid means and, in response to said pressurized fluid release, cause motion-arresting force to be imparted to said movement-arresting means; and
inertia-responsive means independent of chain saw operator manipulation, operable, in response to a kick-back of said chain saw, to actuate said movement-control means and cause said movement-control means to
release said pressurized fluid means, and
cause said motion-arresting force to be imparted to said motion-arresting means.

9. An apparatus as described in claim 8 wherein:
said movement-arresting means includes
clutch means providing a centrifugally responsive drive connection between said engine of said chain saw and said cutter chain,
brake means operable to brakingly engage said clutch means and arrest the transmission of driving energy from said engine to said cutter chain, and
spring means operable to impart braking force to said brake means, with said braking force being operable to cause said brake means to arrest said transmission of driving energy; and
said energy-developing and storing means includes
diaphragm means engaged with said spring means and operable to control transmission of force from said spring means to said brake means,
a crank case included in said chain saw engine operable to supply pressurized gas comprising said pressurized fluid means,
pressure chamber means operable to effect said storing of said pressurized gas comprising said pressurized fluid means therein,
conduit means operable to transmit said pressurized gas from said crank case of said chain saw engine to said pressure chamber means and effect said storing of said pressurized gas the rein, with said diaphragm means being operable to effect said applying of said pressurized fluid means to said movement-arresting means by counter-acting said braking force of said spring means,
check valve means operable to permit a flow of pressurized fluid from said crank case to said pressure chamber means but substantially prevent a flow of pressurized gas from said pressure chamber means to said crank case; and
said movement-control means includes
vent means operable, in response to operation of said inertia-responsive means, to vent pressure from said pressure chamber means and effect said release of said stored, pressurized fluid means;
said pressure chamber means, when pressurized with gas from said crank case, being operable to
impart fluid pressure to said diaphragm means and cause that diaphragm means to maintain said spring means in a position not operable to impart braking force to said brake means;
said vent means when operated in response to operation of said inertia-responsive means, being operable to
vent fluid pressure from said pressure chamber means and
permit said spring means to apply said braking force to said brake means so as to arrest said transmission of energy from said engine to said cutter chain, and
said inertia-responsive means includes
rotor means,
eccentric weight means carried by said rotor means, with said eccentric weight means being operable to cause said rotor means to undergo rotary movement relative to said pressure chamber means in response to a kick-back of said chain saw,
valve means carried by said rotor means and operable to open said vent means in response to said rotary movement of said rotor means, and
spring means operable to bias said rotor means to a position where said valve means closes said vent means.

10. An apparatus in claim 9 wherein:
said spring means is operable to impart braking force to said brake means until, with said vent means closed by said valve means, said chain saw engine achieves an operating speed in excess of an idle speed and develops a sufficient pressure in said crank case to transmit pressurized fluid to said pressure chamber means having a pressure sufficient to act on said diaphragm means and cause said diaphragm means to overcome the force of said spring means required to impart said braking force to said brake means.

* * * * *